United States Patent [11] 3,557,783

[72] Inventor Charles S. Castner
 213 Revere Blvd., Lincoln Park, Reading, Pa. 19609
[21] Appl. No. 630,206
[22] Filed Apr. 12, 1967
[45] Patented Jan. 26, 1971

[54] METHOD OF KILLING MICROPROBES WITH MICROBICIDAL COMPOUNDS AND ULTRAVIOLET LIGHT
 5 Claims, No Drawings

[52] U.S. Cl. .................................................. 128/172.1
[51] Int. Cl. .................................................. A61m 31/00
[50] Field of Search ........................................... 250/43, 84; 21/102, 101, 54; 204/159; 128/172.1, 362, 395

[56] References Cited
UNITED STATES PATENTS

| | | | |
|---|---|---|---|
| 2,232,156 | 2/1941 | Abeles............................ | 128/395 |
| 2,350,462 | 6/1944 | Johns............................. | 250/84 |
| 2,367,660 | 1/1945 | Agre.............................. | 204/159.23 |
| 3,414,499 | 12/1968 | Gardner et al................. | 250/43 |

Primary Examiner—James W. Lawrence
Assistant Examiner—A. L. Birch
Attorney—Buell, Blenko & Ziesenheim ABSTRACT: Microbicidal effects are provided by stimulating the activity of certain compositions by exposing them to light energy in the visible or ultraviolet range of the electromagnetic spectrum.

METHOD OF KILLING MICROPROBES WITH MICROBICIDAL COMPOUNDS AND ULTRAVIOLET LIGHT

This invention relates to methods and means for killing microbes and, more particularly, relates to a system that includes certain reactive materials whose microbicidal effects may be stimulated by exposing these materials to energy in the form of visible or ultraviolet light.

At the outset, it may be convenient to define several terms that are used in this specification and in the accompanying claims. The term "microbe" (and any terms derived therefrom) is used in its conventional sense to refer to any small organisms, including both pathogenic and non-pathogenic organisms. The terms "antimicrobial compositions" and and "microbicides" are used to indicate not only those compositions that are inherently microbicidal, but also those compositions that may become microbicidal in certain environments or under certain conditions of use. Such terms as "kill" and "killing" are used to describe not only the actual killing of microbes, but also the inhibition of microbial generation and regeneration and other morbid processes.

Most common germicides suffer from the defect that when used in effective quantities and concentrations, they may cause certain desirable side effects. Not only is this true of the comparatively recently discovered antibiotics, but it also applies to the standard germicides such as iodine and mercurochrome. For example, as is well known, iodine, when applied in a dilute solution, is an acceptable antiseptic. However, as the tincture evaporates, a stronger and stronger solution results until such time as only iodine and iodine compounds remain. If the surface to which the iodine has been applied is a wound, the residual iodine, after the tincture has evaporated, will burn the healthy tissue, delay healing of the wound, and sometimes cause scar tissue to be formed.

From the foregoing, it can be seen that an ideal microbicide for use in treating human beings and other animal life should be effective to kill microbes but, at the same time, should be nontoxic and noncaustic to animal tissue and should leave no lingering side effects.

Accordingly, it is an object of this invention to prepare compositions and provide methods and apparatus for their use that will provide microbicidal effects.

Another object of this invention is to provide microbicidal compositions and methods and apparatus for their use that are substantially nontoxic to animal life and will have no lingering side effects or toxicity after their microbe-killing function has been completed.

Still a further object of this invention is to provide methods and apparatus whereby substantially nontoxic materials can be controllably stimulated to increase their germicidal activity.

Briefly, the objects of this invention are achieved by utilizing certain compositions that, under the incidence of various light sources, become stimulated to increase their microbicidal effects. Due to the fact that the light source may be turned off and on at will, substantially no toxicity or damage to living tissue will result except under the preselected conditions of use.

The compositions of this invention may be used in comparatively dilute form so that they will be nontoxic to animal life. These materials may be flushed into a wound or other diseased area of the body and be given a period of time to out and penetrate the area of desired treatment. Sufficient time can be given to allow these materials to impregnate since, in their dilute form, they are substantially nontoxic and noncaustic.

After the desired impregnation has been achieved, the compositions of this invention are stimulated to increase their microbicidal activity to such a degree that they will rapidly kill pathogenic organisms. After a sufficient length of treatment, the light source may be removed and the remaining materials that have not been consumed during treatment will return to their relatively passive state and once again become substantially nontoxic and noncaustic. Thus, it can be seen that by treatment in accordance with this invention, there will be no toxic residuum for systemic absorption.

By way of example, as suitable materials for use in this invention, there may be mentioned certain photopolymerization reagents that, under the influence of an ultraviolet lamp, will cause the polymerization of certain materials such as the vinyls and acrylics. It is believed that these materials, under the influence of ultraviolet light, become strong oxidizing or oxygenation agents. When the light source is discontinued, the material that has not been consumed reverts to its previous passive level that is nontoxic and noncaustic to animal life. By way of example, the following photopolymerization reagents may be mentioned: acridine orange, azo-bis-iso-butyronitrile, benzil, benzoin, benzoyl peroxide, diacetyl, 4,5-dibromo fluorescein-Na, ethyl red, flazo orange, flourescein amine, flourescien isothiocyanate, lauroyl peroxide, methylene blue, and rose bengal.

The particular advantage of using the above-enumerated photopolymerization reagents lies in the fact that their activity may be stimulated by energy in the near ultraviolet range of the electromagnetic spectrum, that is, from approximately 3,200 to about 4,000 Angstrom units, and preferably with a strong peak in the range of 3,500 to 3,700 Angstrom units. As is known, ultraviolet light by itself may be highly microbicidal, however, the effective microbicidal range is from about about 2,500 to 2,800 Angstrom units. Unfortunately, energy in this frequency range not only is microbicidal, but may burn and otherwise damage healthy tissue. For this reason, ultraviolet light for the treatment of animal tissue has been severely limited since the undesirable side effects and burns may be worse than the benefit gained. However, this problem is greatly alleviated in the practice of the instant invention due to the fact that ultraviolet light of microbicidal intensity is not required —rather, there is required only a lower intensity of ultraviolet light as is necessary to stimulate the compositions of this invention.

The above discussion has particular pertinency with respect to the treatment of open wounds, incisions, and the like. Here it can be appreciated that to treat the exposed flesh with ultraviolet light only, it is necessary for the intensity of the ultraviolet light to be sufficiently great to penetrate through the surrounding blood and other material to reach and penetrate the infected tissue. When materials are used in accordance with this invention, however, it is necessary only to permit these materials to impregnate the infected tissue to the desired degree and then use a comparatively weaker source of ultraviolet energy that need be only sufficiently intense to stimulate the materials rather than sufficiently intense to be effective as a microbicidal agent per se.

As was noted above, the photopolymerization reagents listed above are of particular interest since their activity may be stimulated at considerably longer frequencies than those that are so damaging to animal tissue. Since these materials will respond effectively at frequencies as high as about 3,700 Angstrom units, they will have little, if any, effect upon healthy animal tissue if controllably used.

In the practice of this invention, certain beneficial side effects can be obtained. For example, the compositions of this invention may be mixed with conventional biostains that, under the influence of ultraviolet light, are capable of distinguishing healthy tissue from diseased or dead tissue. Thus, as would be the case in an open wound, the person delivering treatment is given a visual presentation of the location of greatest damage and the focus where greatest care and thoroughness of treatment are required.

Also, due to the fluorescent nature of the biostains such as the fluorescein compounds, the treatment of tissue in accordance with this invention will provide visual representation of the exact area that has been treated, thus preventing, to a large degree, the accidental omission of treatment of the infected area.

This invention provides means for giving immediate first aid to prevent infections from developing in wounds and injuries. In one aspect of this invention, it is contemplated that a small portable source of ultraviolet energy will be provided that can be hand held and directed into a wound impregnated with with the compositions of this invention. Such a portable unit would be particularly desirable for emergency treatment in ambulances and emergency wards as well as for emergency treatment on the battle field for wounded troops.

In one preferred modification of this invention, the portable source of ultraviolet energy is provided with a small diameter rod of quartz or other ultraviolet light transmitting material so that a fairly small area of light can be directed into the infected area. Advantageously, the energy source may contain both near ultraviolet and far ultraviolet light as well as a directed curtain of visible light. The near ultraviolet light will stimulate the activity of the microbicidal compounds, the far ultraviolet light will provide penetration into the infected area, and the visible light will act as a shield to prevent intrusion of extraneous incidental light.

Although certain embodiments of the invention have been described in the specification, it is to be understood that the invention is not limited thereto, is capable of modification, and can be rearranged without departing from the spirit and scope of the invention.

I claim:

1. A method for killing microbes comprising the steps of contacting an infected area with a composition comprised of a relatively nontoxic, normally relatively passive microbicidal compound which is stimulated to microbicidal activity by ultraviolet light, and stimulating said compound by exposure to light in the ultraviolet range of the electromagnetic spectrum.

2. The method as claimed in claim 1 wherein the microbicidal compound is a member from the group consisting of acridine orange, azo-bis-iso-butyronitrile, benzil, benzoin, benzoyl peroxide, diacetyl, 4,5-dibromo fluorescein Na, ethyl red, flazo orange, fluorescein amine, fluorescein isothiocyanate, lauroyl peroxide, methylene blue, and rose bengal.

3. The method as claimed in claim 1 wherein the microbicidal compound includes a biostrain.

4. The method as claimed in claim 1 wherein the microbicidal compound is a photopolymerization agent.

5. The method as claimed in claim 1 wherein the light in the ultraviolet range of the electromagnetic spectrum is surrounded by a curtain of visible light.